(12) United States Patent
Volk

(10) Patent No.: US 11,878,382 B2
(45) Date of Patent: Jan. 23, 2024

(54) ROTARY INDEXING TABLE ASSEMBLY THAT CAN BE SET UP WITHOUT TOOLS

(71) Applicant: Schaeffler Technologies AG & Co. KG, Herzogenaurach (DE)

(72) Inventor: Wolfgang Volk, Frensdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/767,067

(22) PCT Filed: Sep. 29, 2020

(86) PCT No.: PCT/DE2020/100832
§ 371 (c)(1),
(2) Date: Apr. 7, 2022

(87) PCT Pub. No.: WO2021/089078
PCT Pub. Date: May 14, 2021

(65) Prior Publication Data
US 2022/0362899 A1 Nov. 17, 2022

(30) Foreign Application Priority Data
Nov. 7, 2019 (DE) .................. 10 2019 130 033.9

(51) Int. Cl.
*B23Q 16/06* (2006.01)
*B23Q 1/00* (2006.01)

(52) U.S. Cl.
CPC .......... *B23Q 16/06* (2013.01); *B23Q 1/0081* (2013.01); *B23Q 2220/004* (2013.01)

(58) Field of Classification Search
CPC .................. B23Q 16/06–107; B23B 31/1071
See application file for complete search history.

(56) References Cited

U.S. PATENT DOCUMENTS 5,190,272 A * 3/1993 Zika ................. B23Q 16/08
269/309
6,527,266 B1 * 3/2003 Yonezawa ........... B23Q 1/0081
269/309
6,641,128 B2 * 11/2003 Fries ................... B23Q 11/005
279/4.06

(Continued)

FOREIGN PATENT DOCUMENTS

CN 109623416 A 4/2019
DE 222810 A1 5/1985

(Continued)

OTHER PUBLICATIONS

Machine translation of SU 1189657 A1, obtained from fit database (Year: 1985).*

*Primary Examiner* — Thomas C Diaz

(57) ABSTRACT

A rotary indexing table assembly includes an axis of rotation, a rotation element and a receiving assembly. The rotation element is rotatable about the axis of rotation and has a centering opening coaxial with the axis of rotation. The receiving assembly has a spring system and a pin assembly. The pin assembly has a pin body, movable along the axis of rotation by the spring system and settable in a set-up state or a blocking state. In the set-up state, the rotation element is releasably connected to the receiving assembly, and in the blocking state, the rotation element is fixedly connected to the receiving assembly.

11 Claims, 4 Drawing Sheets

(56) References Cited

U.S. PATENT DOCUMENTS

| | | | | |
|---|---|---|---|---|
| 11,040,847 | B2 * | 6/2021 | Vuoristo | ............... B65H 75/185 |
| 2008/0302208 | A1 * | 12/2008 | Yonenaga | ............ B23Q 11/141 |
| | | | | 279/5 |

FOREIGN PATENT DOCUMENTS

| | | | | |
|---|---|---|---|---|
| DE | 10317342 | A1 * | 11/2004 | ........... B23Q 1/0072 |
| DE | 10317343 | A1 * | 11/2004 | ........... B23Q 1/0072 |
| DE | 102011106792 | A1 | 1/2013 | |
| EP | 1442832 | A1 | 8/2004 | |
| JP | S62255042 | A | 11/1987 | |
| KR | 20130113618 | A | 10/2013 | |
| SU | 1189657 | A1 * | 11/1985 | ........... B23Q 16/102 |

\* cited by examiner

ROTARY INDEXING TABLE ASSEMBLY THAT CAN BE SET UP WITHOUT TOOLS

CROSS-REFERENCE TO RELATED APPLICATIONS

This application is the United States National Phase of PCT Appln. No. PCT/DE2020/100832 filed Sep. 29, 2020, which claims priority to German Application No. DE102019130033.9 filed Nov. 7, 2019, the entire disclosures of which are incorporated by reference herein.

TECHNICAL FIELD

The present disclosure relates to a rotary indexing table assembly that can be set up without tools and has a pressure pin lock.

BACKGROUND

In the case of previously known rotary indexing table assemblies, the loosening and subsequent tightening of screws during set-up of a rotary indexing table assembly requires a considerable amount of time. For this purpose, a respective rotation element is usually screwed to a receiving assembly. This requires an additional tool. In more concrete terms, this means that the additional tool is used to re-set the rotary indexing table assembly in order to loosen or tighten one or more screws. On the one hand, this takes time in order to procure the tool from its storage location and to carry out the corresponding assembly steps. On the other hand, the tool must be procured with associated costs and then stored ready to hand.

BACKGROUND

The present disclosure provides a rotary indexing table assembly that simplifies or accelerates set-up or re-setting.

The present disclosure provides a rotary indexing table assembly, a rotation element and a receiving assembly. Example embodiments are disclosed in the following description, each of which can individually or in combination constitute an aspect of the disclosure.

The disclosure provides a rotary indexing table assembly with an axis of rotation, having a rotation element, which can be rotated about the axis of rotation and has a centering opening coaxial with the axis of rotation. The rotary indexing table assembly also includes a receiving assembly with a pin assembly having a pin body that can be moved along the axis of rotation by means of a spring system and set in a set-up state or a blocking state such that, in the set-up state, the rotation element is releasably connected to the receiving assembly and in the blocking state, the rotation element is fixedly connected to the receiving assembly.

The present disclosure provides that the design of the pin body as an element movable along a stroke movement eliminates the need for a screw connection arrangement, i.e., at least one or more screws, for fixing or clamping the rotary indexing table assembly. The disclosure instead provides for the rotary indexing table assembly to have a rotation element rotatable about an axis of rotation and having a centering opening, and a receiving assembly having a pin assembly. The rotation element and the receiving assembly can be mounted or connected to one another by means of a pressure pin lock. For assembly, the rotation element is joined to the receiving assembly from above in such a way that the pin assembly penetrates the centering opening.

Furthermore, the receiving assembly includes an abutment means system with one or more abutment means, and at least one abutment means is radially movable with respect to the axis of rotation. The rotation element has an abutment system coaxial with the centering opening. The abutment means can have two states for interacting with the abutment system, a blocking state and a set-up state. Whether the abutment means are in the blocking state or in the set-up state can be adjusted, for example, by a stroke movement of the pin assembly along the axis of rotation.

Rotary indexing table assemblies are used both in machining in machine tools and in non-machining automation.

The rotary indexing table assemblies differ according to their use, both in terms of designs and in terms of accuracies and rigidity. In machining, the requirements for accuracy and rigidity are higher than in the non-machining field. Short switching times are required in automation. Also important are short set-up times, which are made possible by the disclosed device.

The fact that the rotation element is releasably or fixedly connected to the receiving assembly concerns in particular the axial movability of the rotation element relative to the receiving assembly along the axis of rotation during operation of the rotary indexing table assembly.

The abutment means can be arranged on a projection plane perpendicular to the axis of rotation, forming a projection circle with their centers, for example. This ensures that the load is distributed as evenly as possible and reduces singular wear and/or evenly distributes component wear.

Furthermore, the abutment means can be designed as spherical bodies. By actuating, i.e., pressing, the pin body, the abutment means can be unlocked or fixed so that the rotation element is in the blocking state or in the set-up state.

After the pin body is released, it is pushed up again by the spring force of the spring system and the abutment means, for example balls, are pushed to the outside again by a taper on the pin body. The rotary indexing table assembly is thus locked and the rotation element can no longer be pulled off upwards in an uncontrolled manner.

During locking, the abutment means, for example balls, press against a circumferential inclined arrangement, for example designed as an edge or groove or slots, of the rotation element. The transverse force introduced via the balls creates a detent effect on the rotation element and thus fixes it in a downward direction. One or more locking means are provided to prevent rotation of the rotation element.

The receiving assembly thus has, for example, one or more balls as abutment means, which are pressed outward from the inside by the pin body. The balls are to be arranged in an abutment means system in corresponding recesses of a central arrangement.

Furthermore, one or more locking means, e.g., designed as sword pins, can be arranged on the receiving assembly. This ensures that the rotation element cannot rotate uncontrollably relative to the receiving assembly.

According to an example embodiment, it is provided, that the pin body of the pin assembly penetrates the centering opening, and the pin body of the pin assembly and the centering opening are arranged in particular coaxially to one another. The centering speeds up assembly and reduces the risk of an offset connection between the rotation element and receiving assembly by positioning the rotation element accurately.

According to an example embodiment, it is provided, that the pin body assumes the set-up state by an axial movement in the direction of the rotary indexing table assembly, and that the pin body assumes the blocking state by an axial movement against the direction of the rotary indexing table assembly, and the spring system presses the pin body into the blocking state, for example. In other words, the set-up state and blocking state change as a result of a stroke movement of the pin body. This allows easy assembly with only a small risk of injury. Another benefit is that assembly is fast and does not require any wearing connecting means, such as screws.

According to an example embodiment, it is provided, that the pin body has at least two different outer diameters. The first outer diameter remote from the rotary indexing table assembly along the axis of rotation is smaller than the second outer diameter facing the rotary indexing table assembly along the axis of rotation. The receiving assembly includes an abutment means system with a central arrangement coaxial with the axis of rotation, which circumferentially has one or more recesses with a smaller cross-section in a radially outward direction with respect to the axis of rotation than in a radially inner section, and one or more recesses each have at least one abutment means. In the blocking state of the pin body, the abutment means are pressed radially outward by the second outer diameter of the pin body and in the set-up state of the pin body exhibit radial play in the section of the first outer diameter of the pin body.

The components can be manufactured at low cost and also enable reliable and at the same time low-wear operation of the rotary indexing table assembly. The abutment means can be designed in various ways, wherein spherical bodies are possible. The pin body thus has at least two outer diameters. These two outer diameters can merge into one another, for example, via a conical connecting section. In this case, the abutment means can alternate between the blocking state and the set-up state between one outer diameter and the other outer diameter, or between one outer diameter and the tapered connection section.

According to an example embodiment, it is provided, that the rotation element has an abutment system coaxial with the centering opening, which at least partially surrounds the pin body, so that, in the blocking state of the pin body, one or more abutment means are pressed radially outwards by the second outer diameter of the pin body in such a way that they brace with the abutment system of the rotation element and fix the rotation element. This is an easily adjustable, reliable and low-wear system. The rotation element is braced and thus secured against unintentional disengagement during operation, i.e., after the set-up has been completed.

According to an example embodiment, it is provided, that the abutment system is designed as an at least partially, e.g., completely, circumferential inclined arrangement. Inclined arrangement means that the abutment system increases radially along the axis of rotation, or decreases radially in the other direction of the axis of rotation.

According to an example embodiment, it is provided, that the one or more abutment means is or are formed as a spherical body/as spherical bodies. Spherical bodies can be manufactured inexpensively and also enable the application to be low-wear. Regular set-up, i.e., changing between set-up state and blocking state, is therefore unproblematic for the rotary indexing table assembly. In particular, they reduce the risk of jamming.

According to an example embodiment, it is provided, that the receiving assembly has one or more locking means to prevent uncontrolled component rotation about the axis of rotation. This ensures that the rotation element cannot rotate relative to the receiving assembly.

The disclosure further relates to a rotation element for a rotary indexing table assembly according to at least one of the aforementioned features, including at least one of the aforementioned features of the rotation element.

The disclosure further relates to a receiving assembly for a rotary indexing table assembly according to at least one of the aforementioned features, including the features of the receiving assembly according to at least one of the aforementioned features of the receiving assembly.

BRIEF DESCRIPTION OF THE DRAWINGS

In the following, the disclosure is explained by way of example with reference to the accompanying drawings using exemplary embodiments. The features shown below can represent an aspect of the disclosure both individually and in combination. In the figures.

DETAILED DESCRIPTION

Figure 1:
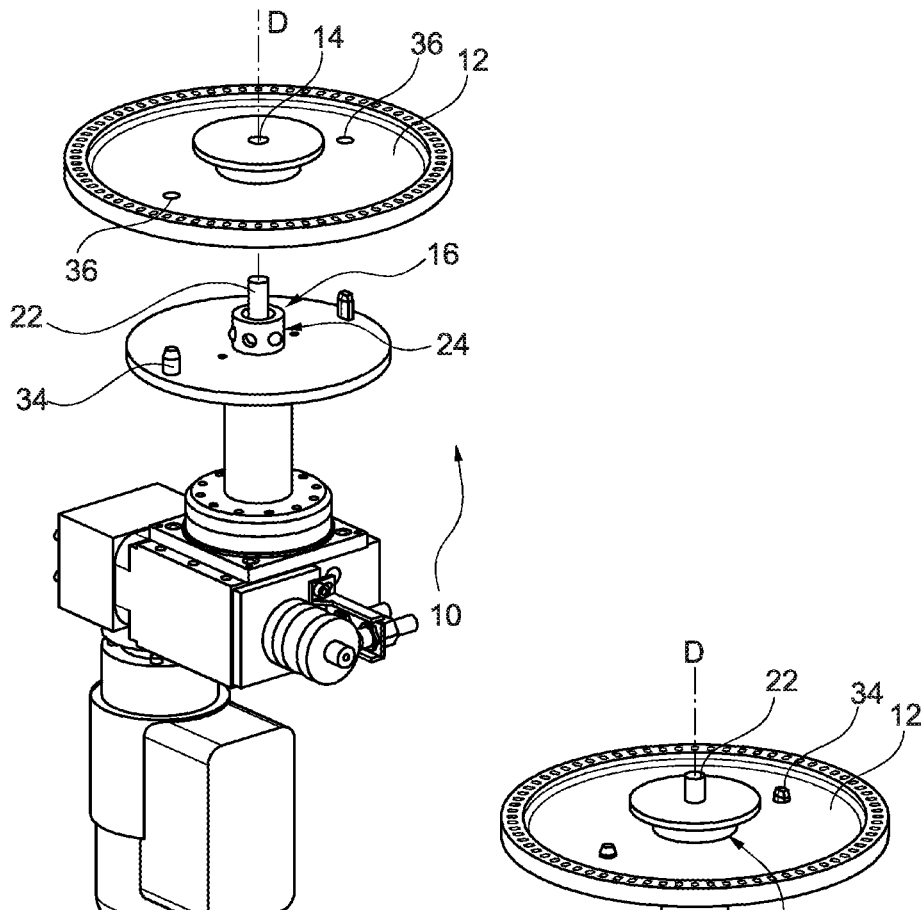
FIG. 1 shows a perspective view of a rotary indexing table assembly according to an example embodiment, wherein a rotation element is shown remote from a receiving assembly.
Figure 2:
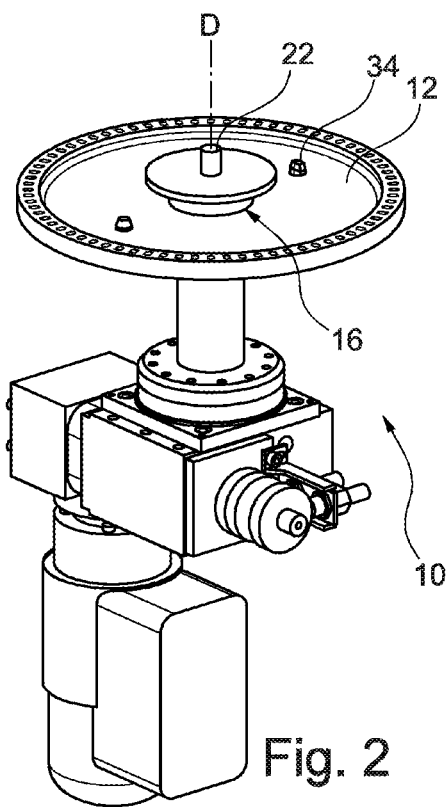
FIG. 2 shows the perspective view of the rotary indexing table assembly according to FIG. 1, wherein the rotation element is shown connected to the receiving assembly.

FIGS. 1 and 2 show a perspective view of a rotary indexing table assembly 10 having an axis of rotation D. The rotary indexing table assembly includes a rotation element 12, which can be rotated about the axis of rotation D and has a centering opening 14 coaxial with the axis of rotation D, and a receiving assembly 16 having a pin assembly 18. FIG. 1 shows an exploded view and FIG. 2 shows a composite view. The exploded view can also be interpreted as a step during the set-up, i.e., after the rotation element 12 has been removed from the receiving assembly 16 or before the rotation element 12 is placed on the receiving assembly 16.

Figure 3:
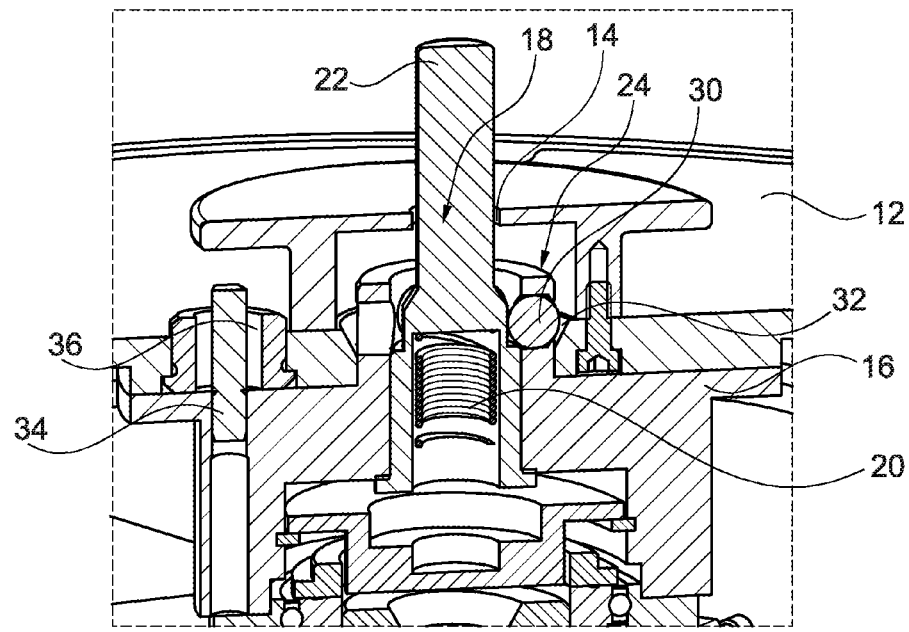
FIG. 3 shows a sectional view of the rotary indexing table assembly according to FIG. 2.
Figure 4:
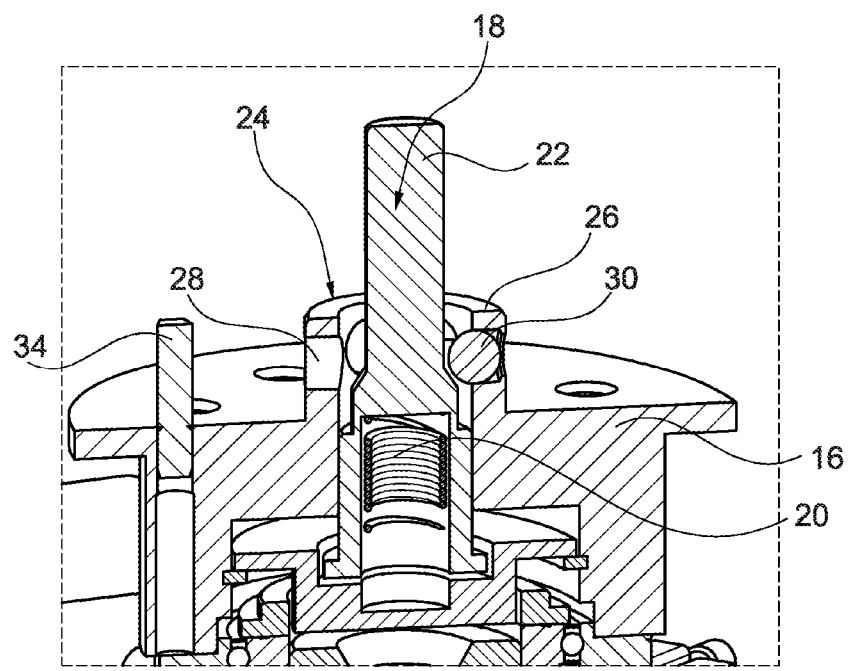
FIG. 4 shows a sectional view of the receiving assembly according to FIG. 3.
Figure 5:
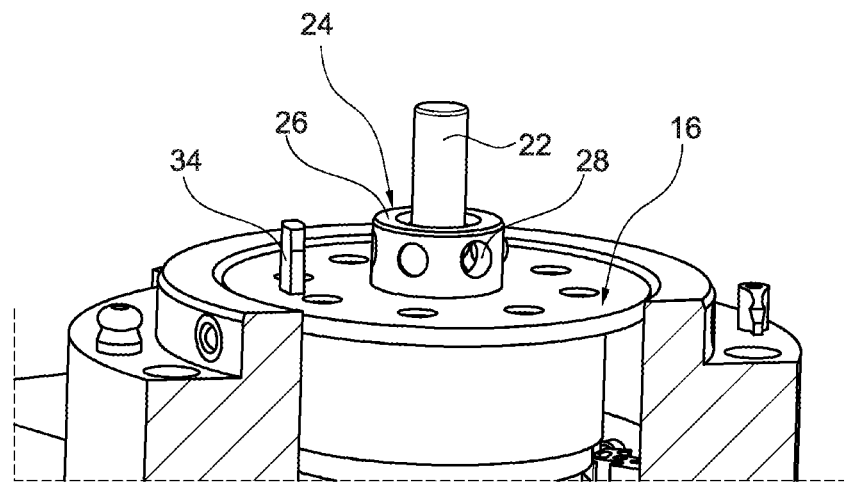
FIG. 5 shows a partially sectional view and partially perspective view of the receiving assembly according to FIG. 4, recessed in the rotary indexing table assembly.

The pin assembly 18 has a pin body 22, which can be moved along the axis of rotation D by means of a spring system 20 and which can be set in a set-up state or a blocking state such that, in the set-up state (ref. FIG. 4), the rotation element 12 is releasably connected to the receiving assembly 16, and in the blocking state (ref. FIG. 3), the rotation element 12 is fixedly connected to the receiving assembly 16. This can be seen better in FIGS. 3 to 6.

In particular, it can be seen well in FIG. 3 that the pin body 22 of the pin assembly 18 penetrates the centering opening 14, and the pin body 22 of the pin assembly 18 and the centering opening 14 are arranged in particular coaxially to one another.

The centering opening 14 can be an integral part of the rotation element 12 or can be arranged on an element that can be connected to the rotation element 12. This must be determined on a type-specific basis.

It may be provided that the pin body 22 assumes the set-up state by an axial movement in the direction of the rotary indexing table assembly 10 and that the pin body 22 assumes the blocking state by an axial movement against the direction of the rotary indexing table assembly 10, and the spring system 20 may press the pin body 22 into the blocking state.

The blocking state is set according to FIG. 2, for example, and can be seen in particular in FIG. 3.

In contrast, the pin body 22 according to FIG. 1 is in the set-up state. This can be seen clearly in FIGS. 4 to 6.

The pin body 22 may have at least two different outer diameters, and the first outer diameter remote from the rotary indexing table assembly 10 along the axis of rotation D, i.e., the upper outer diameter, is smaller than the second outer diameter facing the rotary indexing table assembly 10 along the axis of rotation D, i.e., the lower outer diameter. This can be seen particularly well in FIG. 3 for the blocking state and in FIG. 4 for the set-up state.

In this regard, the receiving assembly 16 has an abutment means system 24 with a central arrangement 26 coaxial with the axis of rotation D, which circumferentially has one or more recesses 28. The recesses 28 have a smaller cross-section in a radially outward direction with respect to the axis of rotation D than in a radially inner section, and and one or more recesses 28 each have at least one abutment means 30.

According to FIG. 3, when the pin body 22 is in the blocking state, the abutment means 30 are pressed radially outward by the second outer diameter of the pin body 22.

According to FIG. 4, in the set-up state of the pin body 22, the abutment means 30 exhibit radial play in the section of the first outer diameter of the pin body 22. Radial play is related to a projection plane perpendicular to the axis of rotation D or to a projection circle perpendicular to the axis of rotation D, respectively. Along this projection circle, the abutment means 30 are at least partially movable in a radial orientation to the axis of rotation D in the set-up state.

Regardless of a particular embodiment, it can be provided that a taper is arranged between two outer diameters of the pin body 22, e.g., according to the aforementioned description, in such a way that the abutment means 30 are pushed or pressed without jamming during a stroke movement of the pin body 22. In an example embodiment, the taper can also include the second outer diameter.

As shown in FIG. 3, the rotation element 12 may have an abutment system 32 coaxial with the centering opening 14, which at least partially surrounds the pin body 22, so that, in the blocking state of the pin body 22, one or more abutment means 30 are pressed radially outwards by the second outer diameter of the pin body 22 in such a way that they brace with the abutment system 32 of the rotation element 12 and fix the rotation element 12.

As shown to be optional in FIG. 3, the abutment system 32 is designed as an at least partially, e.g., completely, circumferential inclined arrangement.

Figure 6:
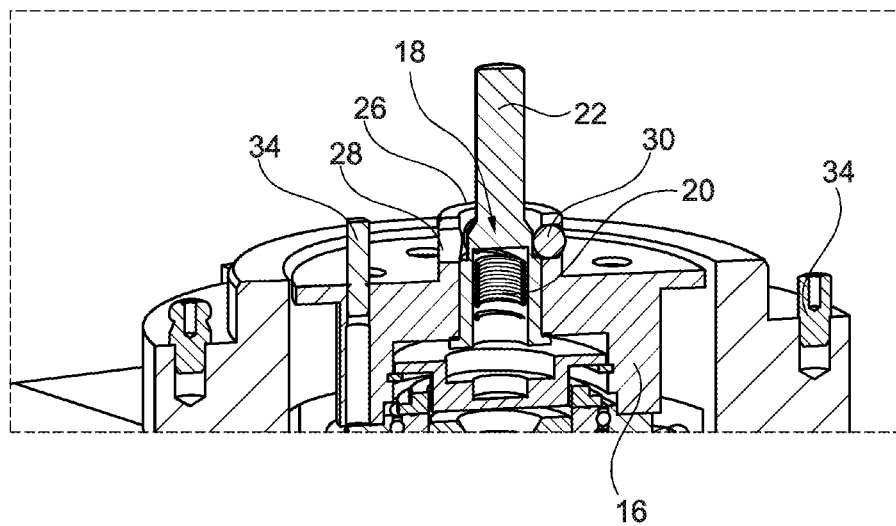
FIG. 6 shows a sectional view of the rotary indexing table assembly according to FIG. 4, recessed in the rotary indexing table assembly.

FIGS. 2, 3 and 6 disclose by way of example that the one or more abutment means 30 is or are designed as a spherical body/as spherical bodies.

Furthermore, the receiving assembly 16 may have one or more locking means 34 to prevent uncontrolled component rotation about the axis of rotation D. Accordingly, the rotation element 12 includes correlating receptacles 36 for abutting the locking means 34.

Figure 7:
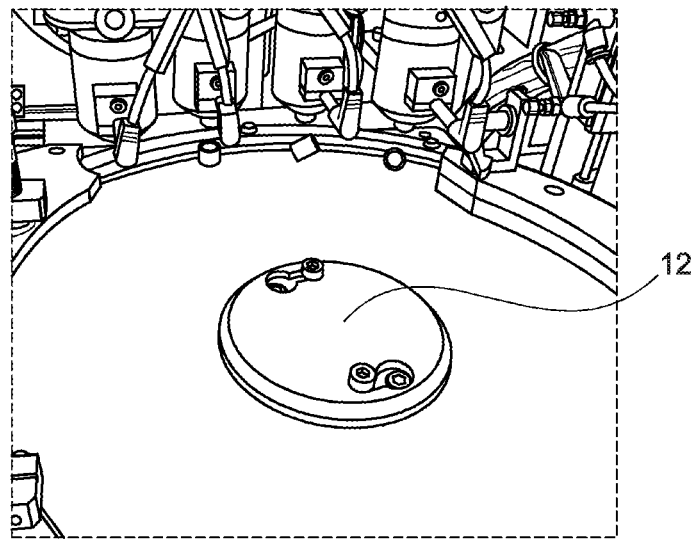
FIG. 7 shows a perspective view of a rotary indexing table assembly; according to the background of the art.
Figure 8:
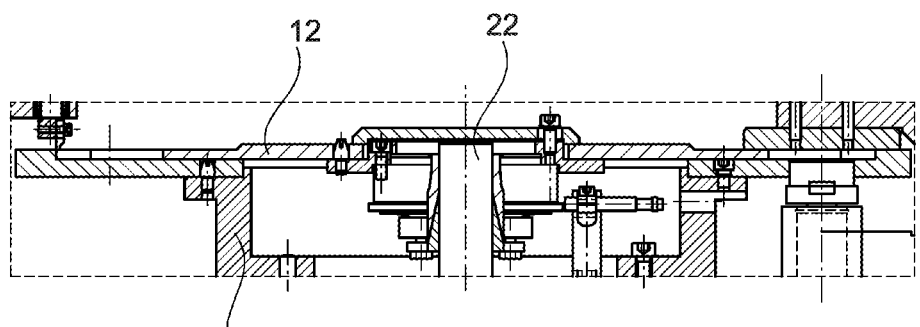
FIG. 8 shows a sectional view of a rotary indexing table assembly according to FIG. 7.

FIGS. 7 and 8 show previously known rotary indexing table assemblies. FIG. 7 shows a perspective view and FIG. 8 a sectional view. Previously known rotary indexing table assemblies cause the loosening and later tightening of screws when setting up a rotary indexing table assembly to take a considerable amount of time. For this purpose, a respective rotation element 12 is usually screwed to a receiving assembly 16. This requires an additional tool. In more concrete terms, this means that the additional tool is used to re-set the rotary indexing table assembly in order to loosen or tighten one or more screws. On the one hand, this takes time in order to procure the tool from its storage location and to carry out the corresponding assembly steps. On the other hand, the tool must be procured with associated costs and then stored ready to hand.

REFERENCE NUMERALS

10 Rotary indexing table assembly
12 Rotation element
14 Centering opening
16 Receiving assembly
18 Pin assembly
20 Spring system
22 Pin body
74 Abutment means system
26 Central arrangement
28 Recess
30 Abutment means
32 Abutment system
34 Locking means
36 Receptacle
D Axis of rotation

The invention claimed is:

1. A rotary indexing table assembly comprising:
an axis of rotation;
a rotation element, rotatable about the axis of rotation, the rotation element comprising a centering opening coaxial with the axis of rotation and a first planar surface; and
a receiving assembly comprising:
   a second planar surface;
   a spring system; and
   a pin assembly, the pin assembly comprising:
      a pin body, movable along the axis of rotation by the spring system and settable in a set-up state or a blocking state such that,
         in the set-up state, the rotation element is releasably connected to the receiving assembly; and
         in the blocking state, the rotation element is fixedly connected to the receiving assembly and the first planar surface is resting directly on the second planar surface.

2. The rotary indexing table assembly of claim 1, wherein:
the pin body penetrates the centering opening; and
the pin body and the centering opening are arranged coaxially to one another.

3. The rotary indexing table assembly of claim 1, wherein:
the pin body assumes the set-up state by an axial movement in a direction of the rotary indexing table assembly; and
the pin body assumes the blocking state by an axial movement against the direction of the rotary indexing table assembly.

4. The rotary indexing table assembly of claim 3 wherein the spring system presses the pin body into the blocking state.

5. The rotary indexing table assembly of claim 1, wherein:
the pin body comprises a first outer diameter and a second outer diameter, different than the first outer diameter, wherein:
 the first outer diameter is remote from the rotary indexing table assembly along the axis of rotation and smaller than the second outer diameter; and
 the second outer diameter faces the rotary indexing table assembly along the axis of rotation;
the receiving assembly comprises an abutment means system with a central arrangement coaxial with the axis of rotation, the abutment means system comprising:
 a circumferentially arranged recess comprising a smaller cross section in a radially outward direction with respect to the axis of rotation than in a radially inner section; and
 an abutment means;
in the blocking state of the pin body, the abutment means is pressed radially outward by the second outer diameter of the pin body; and
in the set-up state of the pin body, the abutment means exhibits radial play in a section of the first outer diameter.

6. The rotary indexing table assembly of claim 5 wherein:
the rotation element comprises:
 an abutment system coaxial with the centering opening, which at least partially surrounds the pin body; and
 in the blocking state, the abutment means is pressed radially outwards by the second outer diameter to brace with the abutment system and fix the rotation element.

7. The rotary indexing table assembly of claim 6, wherein the abutment system is designed as a partially circumferential inclined arrangement.

8. The rotary indexing table assembly of claim 6, wherein the abutment system is designed as a completely circumferential inclined arrangement.

9. The rotary indexing table assembly of claim 6 wherein the abutment means is formed as a spherical body.

10. The rotary indexing table assembly of claim 1 wherein the receiving assembly further comprises a locking means to prevent uncontrolled component rotation about the axis of rotation.

11. The rotary indexing table assembly of claim 10 wherein the locking means is designed as a sword pin.

* * * * *